Dec. 18, 1923.
C. B. HUTCHISON
BRAKE TESTING MECHANISM
Filed Feb. 28, 1921
1,477,960
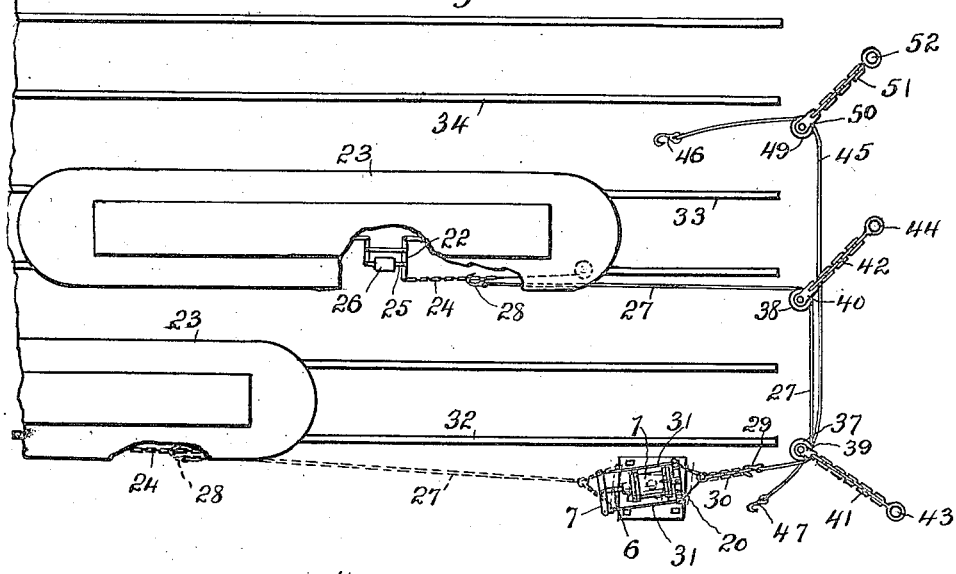
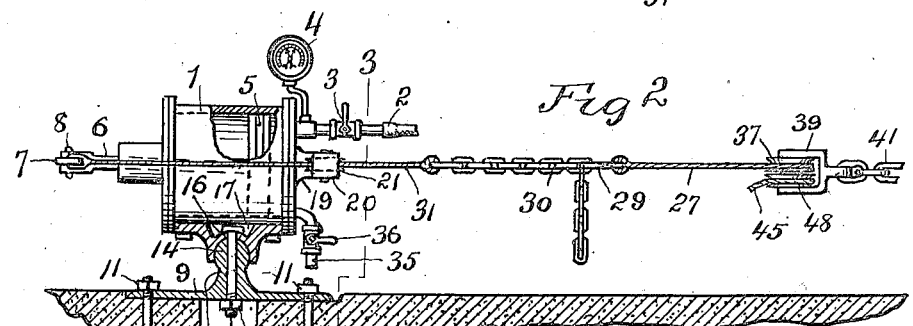
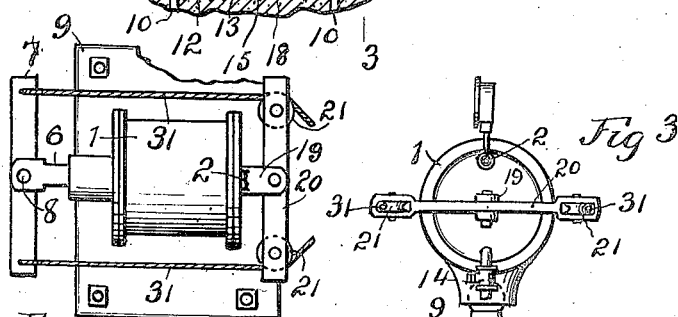
Witness:
R. E. Hamilton
Inventor
Charles B. Hutchison
By Warren D. House
His Attorney Patented Dec. 18, 1923.

1,477,960

UNITED STATES PATENT OFFICE.

CHARLES B. HUTCHISON, OF KANSAS CITY, KANSAS.

BRAKE-TESTING MECHANISM.

Application filed February 28, 1921. Serial No. 448,421.

*To all whom it may concern:*

Be it known that I, CHARLES B. HUTCHISON, a citizen of the United States, residing at Kansas City, in the county of Wyandotte and State of Kansas, have invented a certain new and useful Improvement in Brake-Testing Mechanisms, of which the following is a specification.

My invention relates to improvements in brake testing mechanism.

The object of my invention is to provide novel means for testing car brake mechanisms in their assembled operative positions on cars, which is simple in construction, cheap to make, durable, not liable to get out of order, which is efficient in operation, and with which the brake operating mechanisms of cars on different tracks may be readily tested as to strength.

The novel features of my invention are hereinafter fully described and claimed.

In the accompanying drawing, which illustrates the preferred embodiment of my invention, Fig. 1 is a plan view, partly broken away, of my improved testing mechanism shown applied on separate tracks.

Fig. 2 is a view partly in vertical section, partly in side elevation and partly broken away of my improved testing mechanism, shown on an enlarged scale.

Fig. 3 is a vertical sectional view on the line 3—3 of Fig. 2.

Fig. 4 is an enlarged top view of the pressure cylinder and some of the parts connected therewith.

Similar reference characters designate similar parts in the different views.

1 designates a pressure cylinder having connected with it a pipe 2, adapted to be connected with an air pressure tank or with an air pump, not shown. The pipe 2 may have a shut off cock 3. Connected to the pipe 2 is a pressure indicator 4.

Reciprocative in the cylinder 1 is a piston 5 having a piston rod 6 at the end of the piston which is distant from the pipe 2.

A transverse horizontal member 7 is pivoted at its center by a vertical pin 8 to the outer end of the piston rod 6.

The pressure cylinder 1 is mounted, preferably revolubly, on a fixed anchoring means, comprising a plate 9 through which extends bolts 10 provided with nuts 11 and embedded in a concrete body 12. The plate 9 is provided with a vertical standard 13 having a spherical head 14 revolubly fitted in a socket provided in the lower side of the cylinder 1.

A vertical bolt 15 extends through a slot 16 in the lower side of the cylinder 1, and through the standard 13. The head of the bolt 15 is mounted in a recess 17 provided in the cylinder 1. A nut 18 is mounted on the bolt 15 and bears against the under side of the plate 9.

By means of this construction, the cylinder 1 may have a limited universal movement on the standard 13.

The end of the cylinder 1, which is opposite to the end through which extends the piston rod 6, is provided with a bracket 19, to which is pivoted at its middle portion a horizontal transverse bar 20 having revolubly mounted on it adjacent to its respective ends two pulleys 21.

Referring to Fig. 1, 22 designates an operating lever of an ordinary brake operating mechanism carried by a car 23. The lever 22 has connected to it the ordinary chain 24 which is connected with the usual brake wheel staff. In this type of brake operating mechanism, the lever 22 is also connected with and operated by a piston rod 25 mounted in the usual air pressure cylinder 26.

For testing the brake operating mechanism just described, I provide flexible means arranged to be connected to the chain 24 and so connected with the member 7 that an additional strain may be applied to the lever 22 after the latter has been operated to fully apply the brakes. This flexible means comprises preferably the following described parts.

27 designates a cable having attached to it at one end a hook 28 adapted to releasably engage the chain 24. The other end of the cable 27 has attached to it a hook 29 adapted to releasably engage a chain 30 which is attached to a cable 31 engaging the pulley 21 and having its ends respectively attached to the member 7 at opposite sides respectively of the piston rod 6.

The plate 9 is anchored adjacent to one of a plurality of tracks 32, 33 and 34, which are disposed parallel with one another.

For testing the brakes of a car 23 which is on the track 32, the cylinder 1 is turned to the position shown in dotted lines in Fig. 1, and the hook 28 is attached to the brake chain 24 of the adjacent car.

The brakes on this car are then set with the usual air operated mechanism provided on the car and with a predetermined pressure, which is the maximum pressure afforded by the air supply on the car. The shut off cock 3 is then opened to permit air under pressure to enter the cylinder 1 from the pipe 2. The air pressure in the cylinder 1 will force outwardly the piston rod 6, thereby exerting a pulling braking strain on the chain 24 through the intermediacy of the member 7, cable 31, chain 30, hook 29, cable 27 and hook 28. The introduction of air into the cylinder 1 is continued until the indicator 4 indicates that required additional braking pressure has been applied to the chain 24. If the operating mechanism thus tested stands up to the strain which has been thus applied to it, the mechanism is deemed to be in perfect working condition. If the testing strain applied causes a breakage of any part of the brake operating mechanism, such part must, of course, be repaired or replaced and the parts given another test.

If the normal maximum pressure, which is applied to the brakes, is ninety pounds, an additional pressure of ninety pounds may be applied with the testing mechanism, such a test will provide an ample margin of safety.

To exhaust the air from the cylinder 1, after a test has been made, a pipe 35 having in it a shut off cock 36 is connected to the end of the cylinder 1 to which is connected the pipe 2. When air is admitted to the cylinder 1 through the pipe 2, the cock 36 is closed. After a test, the cock 3 is closed and the cock 36 opened.

In order that the brakes of a car on the track 33 may be tested, the cylinder 1 is turned to the position shown in solid lines in Figs. 1 and 2, and the cable 27 is run over two pulleys 37 and 38 mounted respectively in two pulley blocks 39 and 40 respectively attached to two chains 41 and 42, which are fastened respectively to pins 43 and 44 disposed respectively adjacent to the ends of the tracks 32 and 33. When the parts are so connected and air is admitted to the cylinder 1, the chain 24 of the car on the track 33 will be pulled by the cable 27 so as to apply to the chain the testing pressure, the normal working pressure having been previously applied thereto in the ordinary manner.

In order that the brakes of a car on the more distant track 34 may be tested, there may be provided a cable 45 corresponding to the cable 27 and having attached to its respective ends hooks 46 and 47 adapted to respectively engage a brake chain 24 and the chain 30. The cable 45 is run over a pulley 48, mounted in the pulley block 39 and over a pulley 49 mounted in a pulley block 50 which is attached to a chain 51, which in turn is attached to a pin 52 disposed adjacent to one end of the track 34. The above described arrangement of cables and pulleys permits of the test being made on cars on the different tracks, the positions of the pulleys being such that the strain on the brake chains 24 will be applied in the proper direction.

The mounting of the cylinder 1 by means of universal joint on the standard 13 permits the cylinder to adapt itself to be swung to the two positions shown in Fig. 1, and to cars in which the chains 24 are of different heights when the cars are on the track 32.

I do not limit my invention to the structure shown and described, as many modifications, within the scope of the appended claims may be made without departing from the spirit of my invention.

What I claim is—

1. In a brake testing mechanism, a fixed anchoring means, flexible means arranged for releasable attachment to a movable part of a car brake operating means, and means revoluble on a vertical axis on said anchoring means by which a pulling strain may be applied to said movable part, substantially as set forth.

2. In a brake testing mechanism, a fixed anchoring means, a pressure cylinder revoluble thereon on a vertical axis, a piston reciprocative in said cylinder, and means actuated by said piston and arranged for releasable attachment to a movable part of a car brake operating mechanism by which a pulling strain may be applied to said part, substantially as set forth.

3. In a brake testing mechanism, a fixed anchoring means, a pressure cylinder revoluble thereon on a vertical axis, a piston reciprocative in said cylinder, and flexible means actuated by the piston and arranged for releasable attachment to a movable part of a car brake operating mechanism by which a pulling strain may be applied to said part, substantially as set forth.

4. In a brake testing mechanism, a pressure cylinder, a piston reciprocative therein having a piston rod, a transverse member carried by said piston rod, and a flexible member having means for releasable attachment to a movable part of a car brake mechanism and having two branches attached respectively to said transverse member at opposite sides respectively of said piston rod, substantially as set forth.

5. In a brake testing mechanism, a support, a pressure cylinder revoluble thereon, a piston reciprocative in said cylinder having a piston rod, a transverse member carried by said piston rod, and flexible means arranged for releasable attachment to a movable part of a car brake operating mechanism and having two branches attached respectively to said transverse member at opposite sides of said piston rod, substantially as set forth.

6. In a brake testing mechanism, the combination with a plurality of tracks, of pressure operated means, and means adapted to be connected with said pressure operated means and with the brake operating mechanisms respectively of cars on said tracks, by means of which a braking strain may be applied to said brake operating mechanisms additional to the strain normally applied to said brake operating mechanisms in their ordinary operation, substantially as set forth.

In testimony whereof I have signed my name to this specification.

CHARLES B. HUTCHISON.